(12) United States Patent
Wang et al.

(10) Patent No.: US 9,973,702 B2
(45) Date of Patent: May 15, 2018

(54) TERMINAL, AND APPARATUS AND METHOD FOR PREVIEWING AN IMAGE

(71) Applicants: HISENSE MOBILE COMMUNICATIONS TECHNOLOGY CO., LTD., Shandong (CN); HISENSE USA CORPORATION, Suwanee, GA (US); HISENSE INTERNATIONAL CO., LTD., Shandong (CN)

(72) Inventors: Hongcheng Wang, Shandong (CN); Yaoyao Sui, Shandong (CN); Sanfeng Yan, Shandong (CN); Xing Yang, Shandong (CN); Chao Gao, Shandong (CN); Changsheng Zhou, Shandong (CN)

(73) Assignees: Hisense Mobile Communications Technology Co., Ltd., Shandong (CN); Hisense USA Corporation, Suwanee, GA (US); Hisense International Co., Ltd., Shandong (CN)

( * ) Notice: Subject to any disclaimer, the term of this patent is extended or adjusted under 35 U.S.C. 154(b) by 62 days.

(21) Appl. No.: 15/159,874

(22) Filed: May 20, 2016

(65) Prior Publication Data
US 2017/0085800 A1    Mar. 23, 2017

(30) Foreign Application Priority Data
Sep. 23, 2015   (CN) .......................... 2015 1 0612363

(51) Int. Cl.
*H04N 5/232* (2006.01)
*H04N 5/235* (2006.01)
(Continued)

(52) U.S. Cl.
CPC ....... *H04N 5/23293* (2013.01); *H04N 5/2258* (2013.01); *H04N 5/2351* (2013.01);
(Continued)

(58) Field of Classification Search
CPC ............. H04N 5/2258; H04N 5/23241; H04N 5/23245; H04N 5/23293; H04N 5/2351; H04N 5/23252; H04N 9/735
See application file for complete search history.

(56) References Cited

U.S. PATENT DOCUMENTS 9,491,371 B2 *  11/2016  Chen ................... H04N 5/2256
2005/0259176 A1 * 11/2005  Kyuma ............... H04N 5/2173
                                                   348/362
(Continued)

FOREIGN PATENT DOCUMENTS

CN          103391363          11/2013
CN          103634581 A         3/2014
(Continued)

*Primary Examiner* — Amy Hsu
(74) *Attorney, Agent, or Firm* — Hoffman & Baron, LLP (57) ABSTRACT

Some embodiments of the application disclose a method of previewing an image on a terminal, including: starting at least one camera of a rear dual camera of the terminal, controlling the at least one camera to enter a low-power monitor state; obtaining brightness information and color temperature information of the current scene using the at least one camera in the low-power monitor state; updating in real time automatic exposure parameters of the current scene using the obtained brightness information, and updating in real time color temperature parameters of the current scene using the obtained color temperature information; obtaining an image of the current scene using a camera upon reception of an instruction for starting the camera; correcting color temperature and brightness of the obtained image using the color temperature and automatic exposure parameters of the
(Continued)

current scene updated in real time; and outputting the corrected image as a preview image.

11 Claims, 6 Drawing Sheets

(51) Int. Cl.
*H04N 9/73* (2006.01)
*H04N 5/225* (2006.01)
(52) U.S. Cl.
CPC ....... *H04N 5/2352* (2013.01); *H04N 5/23241* (2013.01); *H04N 9/735* (2013.01); *H04N 5/23245* (2013.01)

(56) References Cited

U.S. PATENT DOCUMENTS

2012/0327264 A1* 12/2012 Spielberg ............... H04N 9/735
348/224.1
2014/0168463 A1* 6/2014 Tamura ................... H04N 9/735
348/223.1
2015/0009396 A1* 1/2015 Ueno ...................... G03B 15/05
348/362
2015/0109445 A1* 4/2015 Wedajo .................... G03B 7/08
348/148
2015/0245003 A1* 8/2015 Lu .......................... H04N 9/735
348/225.1
2015/0249806 A1* 9/2015 Gabel ................. H04N 5/23296
348/14.12

FOREIGN PATENT DOCUMENTS

CN 104349149 2/2015
KR 1020060039800 5/2006

* cited by examiner

TERMINAL, AND APPARATUS AND METHOD FOR PREVIEWING AN IMAGE

CROSS-REFERENCE TO RELATED APPLICATION

This application claims the benefit of Chinese Patent Application No. 201510612363.5, filed with the Chinese Patent Office on Sep. 23, 2015 and entitled "A method and apparatus for previewing an image on a smart terminal, and a terminal", which is hereby incorporated by reference in its entirety.

FIELD

The present application relates to a field of image processing and particularly to an apparatus and method for previewing an image, and a terminal.

BACKGROUND

As terminals (e.g., handsets, computers, cameras, video cameras, etc.) are developed rapidly in hardware and software, a variety of terminals can acquire and process an image, and obtain image and video information.

SUMMARY

Some embodiments of the application provide a method of previewing an image on a terminal, the method including:
starting, by the terminal, at least one camera of a rear dual camera of the terminal;
controlling, by the terminal, the at least one camera to enter a low-power monitor state;
obtaining, by the terminal, brightness information and color temperature information of the current scene using the at least one camera in the low-power monitor state;
updating, by the terminal, in real time automatic exposure parameters of the current scene using the obtained brightness information, and updating in real time color temperature parameters of the current scene using the obtained color temperature information;
obtaining, by the terminal, an image of the current scene using a camera upon reception of an instruction for starting the camera;
correcting, by the terminal, color temperature and brightness of the obtained image using the color temperature and automatic exposure parameters of the current scene updated in real time; and
outputting, by the smart terminal, the corrected image as a preview image.

Some embodiments of the application provide a method of previewing an image on a terminal, the method including:
starting, by the terminal, a front camera of the terminal;
controlling, by the terminal, the front camera to enter a low-power monitor state;
obtaining, by the terminal, brightness information and color temperature information of the current scene using the front camera in the low-power monitor state; and
updating, by the terminal, in real time automatic exposure parameters of the current scene using the obtained brightness information, and updating in real time color temperature parameters of the current scene using the obtained color temperature information;
obtaining, by the terminal, an image of the current scene using a camera upon reception of an instruction for starting the camera;
correcting, by the terminal, color temperature and brightness of the obtained image using the color temperature parameters and the automatic exposure parameters of the current scene updated in real time; and
outputting, by the terminal, the corrected image as a preview image.

Some embodiments of the application provide a terminal including:
a sensor and camera module including a rear dual camera, the sensor and camera module configured to:
  start and control at least one camera of the rear dual camera to enter a low-power monitor state;
  obtain brightness information and color temperature information of the current scene using the at least one camera in the low-power monitor state;
  update in real time automatic exposure parameters of the current scene using the obtained brightness information, and update in real time color temperature parameters of the current scene using the obtained color temperature information;
  obtain an image of the current scene using a camera upon reception of an instruction for starting the camera; and
a processor configured to:
  correct color temperature and brightness of the obtained image using the color temperature parameters and the automatic exposure parameters of the current scene updated in real time; and
  output the corrected image as a preview image.

Some embodiments of the application provide a terminal including:
a sensor and camera module including a front camera, the sensor and camera module configured to:
  start and control the front camera to enter a low-power monitor state;
obtain brightness information and color temperature information of the current scene using the front camera in the low-power monitor state;
  update in real time the automatic exposure parameters of the current scene using the obtained brightness information, and update in real time the color temperature parameters of the current parameter using the obtained color temperature information;
  obtain an image of the current scene using a camera upon reception of an instruction for starting the camera; and
a processor configured to:
  correct color temperature and brightness of the obtained image using the color temperature parameters and the automatic exposure parameters of the current scene updated in real time; and
  output the corrected image as a preview image.

BRIEF DESCRIPTION OF THE DRAWINGS

In order to make technical solutions according to some embodiments of the application more apparent, drawings to which reference is made in the description of the embodiments will be described below in brief, and the drawings described below illustrate some embodiments of the application, and those ordinarily skilled in the art can further derive other embodiments from these drawings without any inventive effort. In the drawings.

DETAILED DESCRIPTION OF THE EMBODIMENTS

In order to make objects, technical solutions, and advantages of the application more apparent, the application will be described below with reference to the drawings, and the embodiments as described are merely a part but not all of the embodiments of the application. All the other embodiments which can occur to those ordinarily skilled in the art from the described embodiments of the application without any inventive effort shall fall into the scope of the application as claimed.

Some embodiments of the application can be applicable to a variety of terminals, for example to a terminal with a light sensor and an RGB sensor (i.e. a color sensor), a terminal with a rear dual camera (including a first camera and a second camera), and a terminal with a front camera and a rear camera, and some embodiments of the application can be applicable to any terminal with an assembly acquiring optical environment color temperature and brightness information.

It shall be noted that a terminal with a rear dual camera, and a terminal with a front camera and a rear camera can also include a light sensor and an RGB sensor, and if the rear dual camera, the front camera, and the rear camera of the terminals operate in a photographing mode, some embodiments of the application can obtain brightness or color related parameters using the light sensor and the RGB sensor of the terminals.

Figure 1:
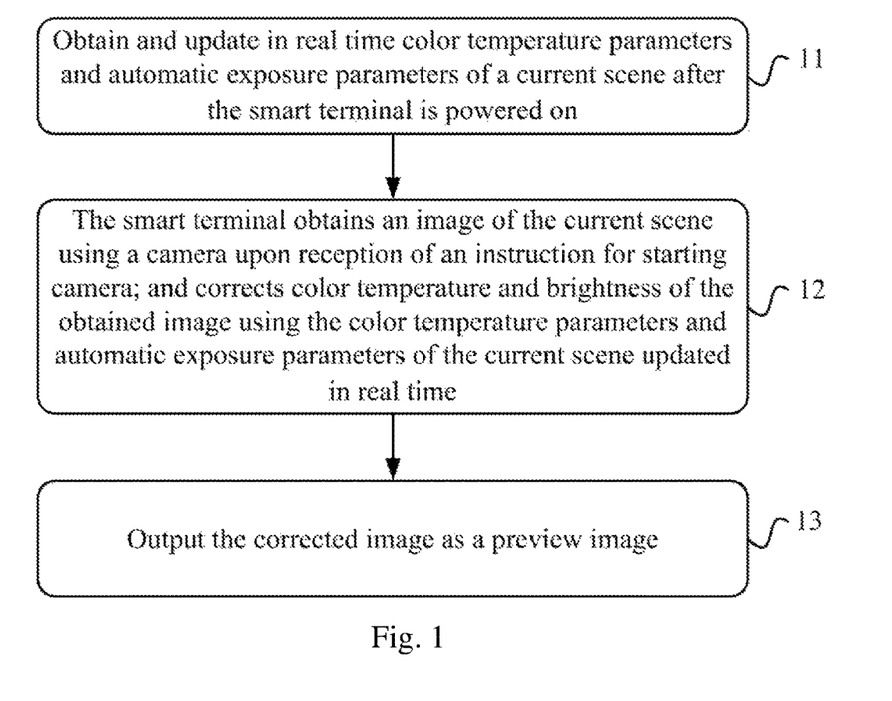
FIG. 1 is a schematic flowchart of a method for previewing an image on a terminal according to some embodiments of the application.

FIG. 1 illustrates a schematic flowchart of a method for previewing an image on a terminal according to an embodiment of the application, and as illustrated in FIG. 1, the flow can include:

The step 11 is to obtain and update in real time color temperature and automatic exposure parameters of a current scene.

The step 12 is to obtain an image of the current scene using a camera upon reception of an instruction for starting the camera; and to correct color temperature and brightness of the obtained image using the color temperature and automatic exposure parameters of the current scene updated in real time.

The step 13 is to output the corrected image as a preview image.

In some embodiments of the application, in the step 11, a light sensor and a color sensor are started; brightness information of the current scene is obtained using the started light sensor, and the automatic exposure parameters of the current scene are updated using the obtained brightness information; and color information of the current scene is obtained using the started color sensor, and color temperature parameters of the current scene are updated using the obtained color information; and In some embodiments of the application, in the step 11, one camera of the rear dual camera of the terminal is started and controlled to enter a low-power monitor state; brightness information and color temperature information of the current scene are obtained using the camera in the low-power monitor state; the automatic exposure parameters of the current scene are updated using the obtained brightness information; and the color temperature parameters of the current scene are updated using the obtained color temperature information.

In some embodiments of the application, in the step above, the terminal obtains pixel values of the rear dual camera respectively, and determines whether the pixel values of the rear dual camera are the same, and if so, then the terminal controls either of the cameras in the rear dual camera to enter the low-power monitor state; otherwise, the terminal controls the camera with the lower pixel value to enter the low-power monitor state.

In some embodiments of the application, the step 11 can be performed after the terminal is powered on.

In some embodiments of the application, in the step 12, the terminal determines started camera(s) of the rear dual camera upon reception of the instruction for start of the rear dual camera; and if both cameras of the rear dual camera are started, then the terminal controls the rear dual camera to enter a normal photographing state from the low-power monitor state; or if only one camera of the rear dual camera is started, then the terminal controls the started camera to enter a normal photographing state from the low-power monitor state, and starts and controls the other camera which is not started, to enter the normal photographing state.

In some embodiments of the application, in the step 12, the terminal obtains the image of the current scene using a front camera upon reception of the instruction for starting the front camera; corrects the color temperature and the brightness of the obtained image using the color temperature and automatic exposure parameters of the current scene updated in real time through the rear dual camera in the low-power monitor state; and disables the rear dual camera in the low-power monitor state after N frames of preview images are output consecutively.

In some embodiments of the application, in the step 11, after the terminal is powered on, the terminal starts and controls the front camera of the terminal to enter the low-power monitor state; obtains the brightness information and the color temperature information of the current scene using the front camera in the low-power monitor state; updates the automatic exposure parameters of the current scene using the obtained brightness information; and updates the color temperature parameters of the current scene using the obtained color temperature information.

In some embodiments of the application, in the step 12, the terminal controls the front camera to enter the normal photographing state from the low-power monitor state, upon reception of the instruction for starting the front camera.

In some embodiments of the application, in the step 12, the terminal obtains the image of the current scene through the rear dual camera upon reception of the instruction for starting the rear dual camera; corrects the color temperature and the brightness of the obtained image using the color temperature and automatic exposure parameters of the current scene updated in real time through the front camera in the low-power monitor state; and disables the front camera in the low-power monitor state after N frames of preview images are output consecutively.

Some embodiments of the application propose a method for monitoring an optical environment, and adjusting initial color temperature and brightness of a camera dynamically, where color temperature and brightness conditions of a current scene are monitored in real time through another optical element or assembly (e.g., an optically sensitive sensor and an RGB sensor, a secondary camera in the dual camera, a front camera, etc.), and after the camera is started, environment color temperature and brightness information obtained by the element (or the assembly) is invoked dynamically as initial color temperature and exposure parameters for processing image of the camera so that the initial color temperature and brightness of the camera is as close as possible to the optical environment in which the picture is taken, to thereby avoid a color difference and excessive (or insufficient) brightness from occurring.

In some embodiments of the application, the color temperature and brightness information of the surrounding environment can be obtained in real time and dynamically by the optically sensitive sensor (also referred to as a light sensor) and an RGB sensor (also referred to as a color sensor) in cooperation.

Figure 2:
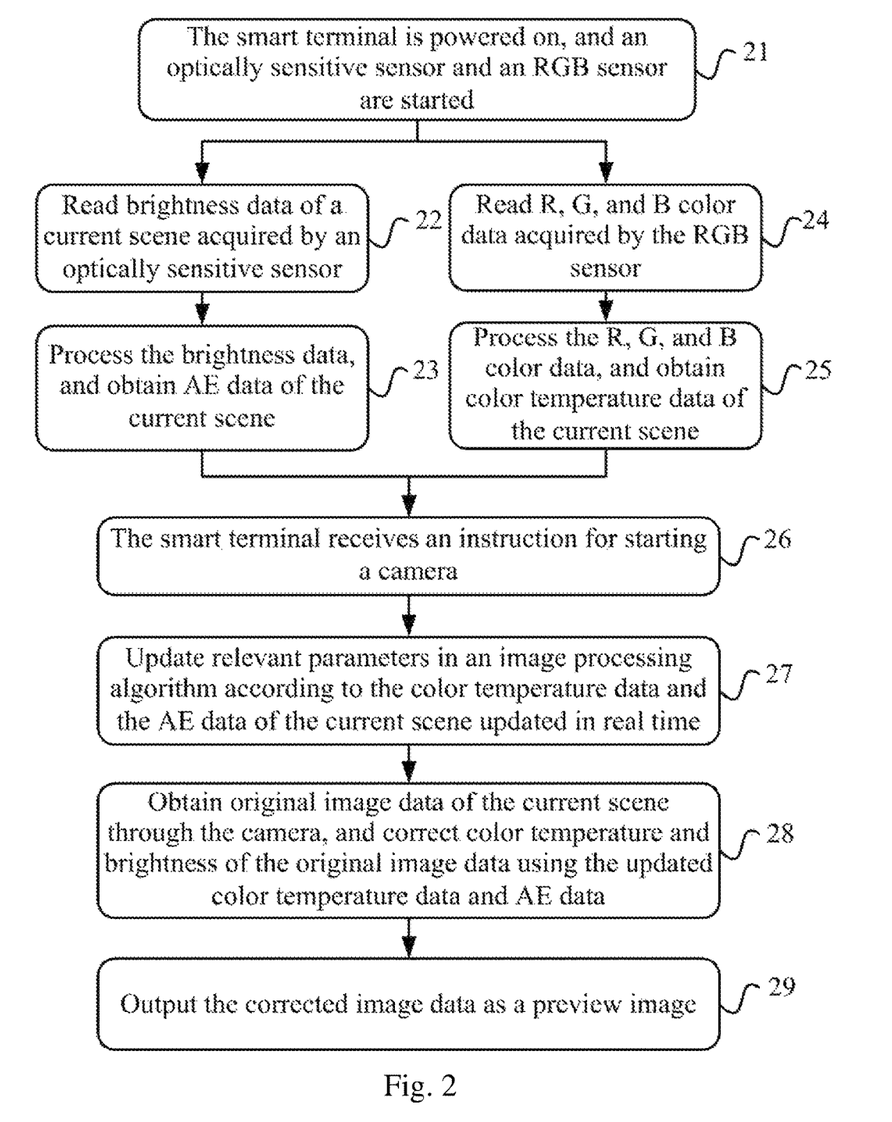
FIG. 2 is a schematic flowchart of a method for previewing an image according to some embodiments of the application where color temperature and brightness information of a surrounding environment is obtained in real time and dynamically using a sensor.

FIG. 2 illustrates a schematic flowchart of a method for previewing an image according to some embodiments of the application where color temperature and brightness information of a surrounding environment is obtained in real time and dynamically using a sensor, and as illustrated in FIG. 2, the flow can include:

In the step 21, a terminal is powered on, and an optically sensitive sensor and an RGB sensor are started.

After the step 21 is performed, the steps 22 and 23 and the steps 24 and 25 can be performed concurrently, or the steps 22 and 23 and the steps 24 and 25 can be performed separately. After the steps 23 and 25 are performed, the step 26 is performed.

The step 22 is to read brightness data of a current scene acquired by the optically sensitive sensor.

The step 23 is to process the brightness data read in the step 22, and to obtain Automatic Exposure (AE) data (i.e., AE parameters) of the current scene.

The step 24 is to read R, G, and B color data acquired by the RGB sensor.

The step 25 is to process the R, G, and B color data read in the step 24, and to obtain color temperature data (i.e., color temperature parameters) of the current scene.

The step 26 is to receive an instruction for starting a camera.

The step 27 is to update relevant parameters in an image processing algorithm according to the color temperature data and the AE data of the current scene updated in real time.

The step 28 is to obtain original image data of the current scene through the camera, and to correct color temperature and brightness of the original image data using the color temperature data and the AE data updated in the step 27.

The step 29 is to output the corrected image data as a preview image.

After the step 29 is performed, the flow can further include: upon reception of a photographing instruction, the terminal obtains original image data of the current scene through the camera, corrects color temperature and brightness of the original image data using the color temperature data and the AE data of the current scene updated in real time, and outputs the corrected image data as the taken image.

In some embodiments of the application, color temperature and brightness information of a surrounding environment can be obtained in real time and dynamically through a secondary camera or a primary camera in a dual camera.

Figure 3:
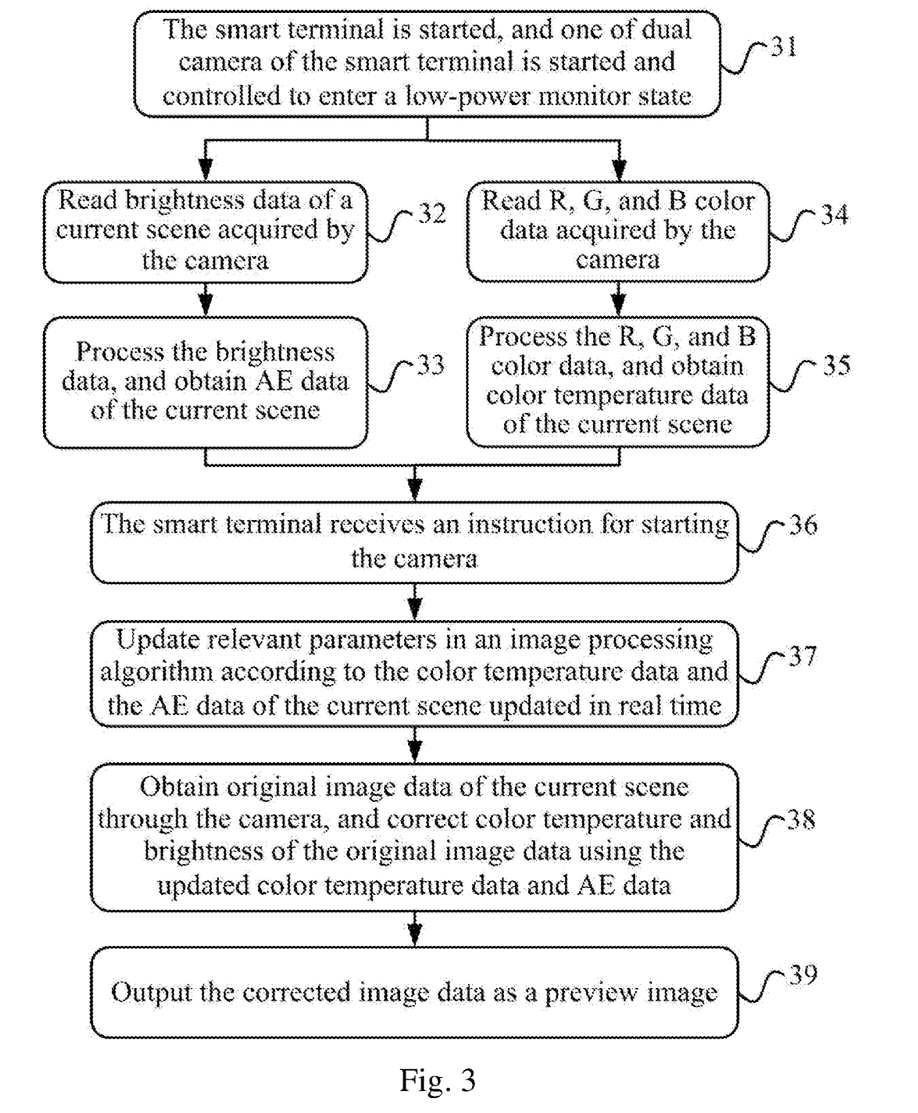
FIG. 3 is a schematic flowchart of a method for previewing an image according to some embodiments of the application where color temperature and brightness information of a surrounding environment is obtained in real time and dynamically using a first camera or a second camera of a rear dual camera.

FIG. 3 illustrates a schematic flowchart of a method for previewing an image according to some embodiments of the application where color temperature and brightness information of a surrounding environment is obtained in real time and dynamically using a secondary camera or a primary camera of a rear dual camera, and as illustrated in FIG. 3, the flow can include:

In the step 31, a terminal is started, and one camera of the rear dual camera of the terminal is started and controlled to enter a low-power monitor state.

It shall be noted that in an embodiment of the application, the rear dual camera of the terminal can include a primary camera (a first camera) with a higher pixel value, and a secondary camera (a second camera) with a lower pixel value. Of course, they can alternatively be two cameras with the same pixel value.

In some embodiments of the application, the camera operating in the low-power mode can only operate in a monitor state, that is, the camera can only operate with low power consumption; and the camera operating in the low-power mode can obtain real-time color temperature and AE information without displaying any image information, so the camera in this mode can be regarded as only operating in a backend state without affecting any operation of the current terminal.

In some embodiments of the application, either camera of the rear dual camera can be controlled to enter the low-power monitor state. Of course, in some embodiments of the application, both of the cameras can alternatively be controlled to enter the low-power monitor state, but preferably one of the cameras can be controlled to enter the low-power monitor state in order to conserve resources of the system and save power.

The terminal can obtain pixel values of the cameras in the rear dual camera respectively, and determine whether the pixel values of the cameras are the same, and if so, then the terminal can control either of the cameras in the rear dual camera to enter the low-power monitor state; otherwise, the terminal can control a camera with the lower pixel value to enter the low-power monitor state.

For example, the camera with the lower pixel value is set as a secondary camera, which typically occupies less resources of the system and consumes lower power than a primary camera, so in some embodiments of the application, the secondary camera can be selected to enter the low-power monitor state.

After the step 31 is performed, the steps 32 and 33 and the steps 34 and 35 can be performed concurrently, or the steps 32 and 33 and the steps 34 and 35 can be performed separately. After the steps 33 and 35 are performed, the step 36 is performed.

The step 32 is to read brightness data of a current scene acquired by the camera.

The step 33 is to process the brightness data read in the step 32, and to obtain Automatic Exposure (AE) data (i.e., AE parameters) of the current scene.

The step 34 is to read R, G, and B color data acquired by the camera.

The step 35 is to process the R, G, and B color data read in the step 34, and to obtain color temperature data (i.e., color temperature parameters) of the current scene.

The step 36 is to receive an instruction for starting the camera.

The step 37 is to update relevant parameters in an image processing algorithm according to the color temperature data and the AE data of the current scene updated in real time.

The step 38 is to obtain original image data of the current scene through the camera, and to correct color temperature and brightness of the original image data using the color temperature data and the AE data updated in the step 37.

The step 39 is to output the corrected image data as a preview image.

In some embodiments, the terminal firstly determines whether one or both of the cameras in the rear dual camera are started, upon reception of an instruction for starting the rear dual camera. If both cameras of the rear dual camera are started, then the terminal controls the rear dual camera to enter a normal photographing state from the low-power monitor state; or if only one camera of the rear dual camera is started, then the terminal controls the started camera to enter a normal photographing state from the low-power monitor state, and starts and controls the other camera which is not started, to enter the normal photographing state.

In some embodiments, the terminal obtains an image of the current scene using a front camera upon reception of an instruction for starting the front camera; corrects color temperature and brightness of the obtained image using the color temperature and automatic exposure parameters of the current scene updated in real time through the rear dual camera in the low-power monitor state; and disables the rear dual camera in the low-power monitor state after N frames of preview images are output consecutively.

In some embodiments of the application, after either or both cameras of the rear dual camera are started in the steps, on the one hand, since at least one camera of the rear dual camera is started and operates in the low-power monitor state, it will not be necessary to start the started camera again, but it will suffice to control the started camera to enter the normal photographing state from the low-power monitor state, where if both cameras of the rear dual camera are started and operate in the low-power monitor state, then both cameras of the rear dual camera are controlled to enter the normal photographing state from the low-power monitor state; and if only one camera of the rear dual camera is started and operates in the low-power monitor state, then the started camera is controlled to enter the normal photographing state from the low-power monitor state, and the other camera which is not started is started and controlled to enter the normal photographing state. On the other hand, if the terminal receives the instruction for starting the front camera, then, since at this time the terminal obtains the color temperature and automatic exposure parameters of the current scene using the rear dual camera started and operating in the low-power monitor state, the terminal can correct the color temperature and the brightness of the obtained image using the color temperature and automatic exposure parameters of the current scene updated in real time (obtained and updated in real time by the rear dual camera) when it takes a picture by using the front camera, so that the color difference or distortion of the camera can be eliminated as long as any picture is taken; and moreover after N frames of preview images are output consecutively, the rear dual camera in the low-power monitor state can be further disabled to thereby conserve the resources of the system and power of the battery. Furthermore, in some embodiments of the application, after the camera exits the normal photographing mode, the sensors or the camera can be controlled again to further obtain and update in real time the color temperature and automatic exposure parameters of the current scene.

In some embodiments of the application, the color temperature and brightness information of the surrounding environment can be obtained in real time and dynamically using the front camera.

Figure 4:
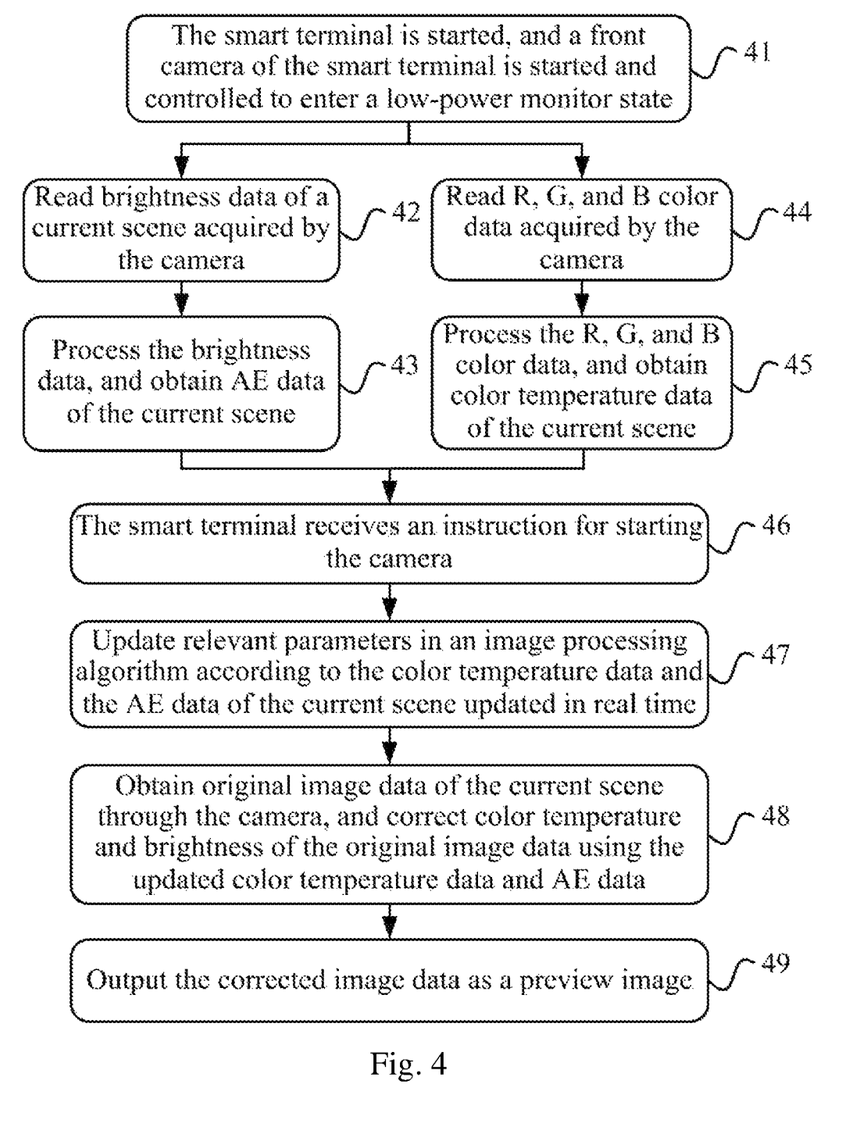
FIG. 4 is a schematic flowchart of a method for previewing an image according to some embodiments of the application where color temperature and brightness information of a surrounding environment is obtained in real time and dynamically using a front camera.

FIG. 4 illustrates a schematic flowchart of a method for previewing an image according to some embodiments of the application where color temperature and brightness information of a surrounding environment is obtained in real time and dynamically using a front camera, and as illustrated in FIG. 4, the flow can include:

In the step 41, a terminal is powered on, and a front camera of the terminal is controlled to enter a low-power monitor state.

It shall be noted that in some embodiments of the application, the camera operating in the low-power mode can only operate in a monitor state, that is, the camera can only operate with low power consumption; and the camera operating in the low-power mode can obtain real-time color temperature and AE information without displaying any image information, so the camera in this mode can be regarded as only operating in a backend state without affecting any operation of the current terminal.

It shall be noted that the terminal is provided with a front camera with a lower pixel value (a third camera) and a rear camera with a higher pixel value (a fourth camera), and in order to enable the rear camera to operate normally, in some embodiments of the application, preferably the front camera can be controlled to enter the low-power monitor state. Of course, in an embodiment of the application, alternatively the rear camera can be controlled to enter the low-power monitor state, but if the rear camera needs to be started, then the rear camera will be controlled to exit the low-power monitor state and to enter a normal photographing state.

In some embodiments of the application, the front camera is not frequently started, so preferably the color temperature and AE information can be obtained using the front camera so that resources of the system are not wasted because of frequently switching the rear camera between the low-power monitor state and the normal photographing state. Then, after several preview image frames are output, in some embodiments of the application, the front camera in the low-power monitor state can be further disabled automatically so that the resources of the system and the power can be further saved, and also after the user starts a photograph program in the terminal, the user can see immediately a preview image matching with the real environment without any wait, thus avoiding the distortion of the preview image.

After the step 41 is performed, the steps 42 and 43 and the steps 44 and 45 can be performed concurrently, or the steps 42 and 43 and the steps 44 and 45 can be performed separately. After the steps 43 and 45 are performed, the step 46 is performed.

The step 42 is to read brightness data of a current scene acquired by the camera.

The step 43 is to process the brightness data read in the step 42, and to obtain Automatic Exposure (AE) data (i.e., AE parameters) of the current scene.

The step 44 is to read R, G, and B color data acquired by the camera.

The step 45 is to process the R, G, and B color data read in the step 44, and to obtain color temperature data (i.e., color temperature parameters) of the current scene.

The step 46 is to receive an instruction for starting a camera.

The step 47 is to update relevant parameters in an image processing algorithm according to the color temperature data and the AE data of the current scene updated in real time.

The step 48 is to obtain original image data of the current scene through the camera, and to correct color temperature and brightness of the original image data using the color temperature data and the AE data updated in the step 47.

The step 49 is to output the corrected image data as a preview image.

The terminal controls the front camera to enter from the low-power monitor state to the normal photographing state, upon reception of an instruction for starting the front camera.

The terminal obtains image of the current scene using the rear dual camera upon reception of an instruction for starting the rear dual camera; corrects color temperature and brightness of the obtained image using the color temperature and automatic exposure parameters of the current scene updated in real time through the front camera in the low-power monitor state; and disables the front camera in the low-power monitor state after N frames of preview images are output consecutively.

In some embodiments of the application, after the front camera is started in the step above, on the one hand, if the terminal receives the instruction for starting the front camera, then, since the front camera is started and operates in the low-power monitor state, it will not be necessary to start the front camera again, but it will suffice to control the camera to enter the normal photographing state from the low-power monitor state. On the other hand, if the terminal receives the instruction for starting the rear dual camera, then, since at this time the rear dual camera is not started, the terminal can firstly start the rear dual camera, and obtain the image of the current scene through the rear dual camera; and then correct the color temperature and the brightness of the obtained image using the color temperature and automatic exposure parameters of the current scene updated in real time by the front camera in the low-power monitor state; and after N frames of preview images are output consecutively, the terminal disables the front camera in the low-power monitor state to thereby save the resources of the system and the power of the battery. In some embodiments of the application, after the camera exits the normal photographing mode, the sensors or the camera can be controlled again as described above to further obtain and update in real time the color temperature and automatic exposure parameters of the current scene.

In some embodiments of the application, after the terminal is powered on, the terminal can obtain and update in real time the color temperature and automatic exposure parameters of the current scene so that as long as the user decides at any time to start a photograph program, the terminal can invoke the color temperature and automatic exposure parameters matching the current environment, and correct the color temperature and the brightness of the preview image using the color temperature and automatic exposure parameters matching the current environment to thereby avoid the color difference or distortion from occurring in any output image frame.

In some embodiments of the application, after the terminal is powered on, the terminal can obtain and update in real time the color temperature and automatic exposure parameters of the current scene so that the terminal can invoke the color temperature and automatic exposure parameters matching the current environment, and correct the color temperature and the brightness of the preview image using the color temperature and automatic exposure parameters matching the current environment.

Figure 5:
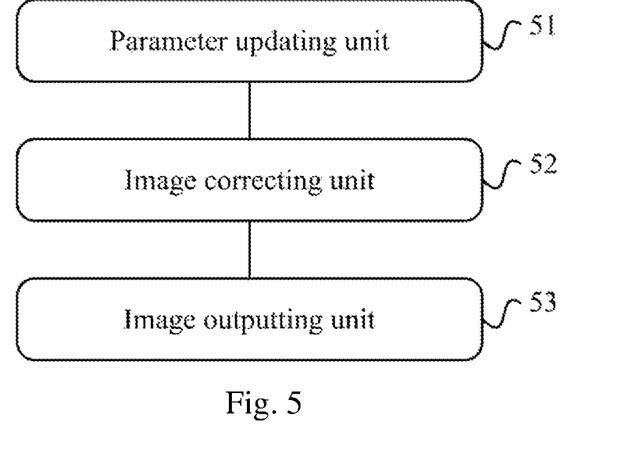
FIG. 5 is a schematic structural diagram of an apparatus for previewing an image on a terminal according to some embodiments of the application.

Based upon the same technical idea, some embodiments of the application provide an apparatus for previewing an image on a terminal, and FIG. 5 illustrates a schematic structural diagram of an apparatus for previewing an image on a terminal according to some embodiments of the application, where as illustrated in FIG. 5, the apparatus can include:

A parameter updating unit 51 is configured to obtain and update in real time color temperature and automatic exposure parameters of a current scene after the terminal is powered on;

An image correcting unit 52 is configured to obtain an image of the current scene using a camera upon reception of an instruction for starting the camera; and to correct color temperature and brightness of the obtained image using the color temperature and automatic exposure parameters of the current scene updated in real time; and An image outputting unit 53 is configured to output the corrected image as a preview image.

In some embodiments of the application, the parameter updating unit 51 is configured to start a light sensor and a color sensor after the terminal is powered on; to obtain brightness information of the current scene using the started light sensor, and to update the automatic exposure parameters of the current scene using the obtained brightness information; and to obtain color information of the current scene using the started color sensor, and to update the color temperature parameters of the current scene using the obtained color information.

In some embodiments of the application, the parameter updating unit 51 is configured to start and control one camera of the rear dual camera of the terminal to enter a low-power monitor state, after the terminal is powered on; to obtain brightness information and color temperature information of the current scene using the camera in the low-power monitor state; to update the automatic exposure parameters of the current scene using the obtained brightness information; and to update the color temperature parameters of the current scene using the obtained color information.

In some embodiments of the application, the parameter updating unit 51 is configured to obtain pixel values of cameras of the rear dual camera respectively, to determine whether the pixel values of the rear dual camera are the same, and if so, to control either of the cameras in the rear dual camera to enter the low-power monitor state; otherwise, to control the camera with the lower pixel value to enter the low-power monitor state.

In some embodiments of the application, the apparatus further includes:

A photographing unit is configured to determine whether one or both of cameras of the rear dual camera are started, upon reception of the instruction for starting the rear dual camera; and if both cameras of the rear dual camera are started, to control the rear dual camera to enter a normal photographing state from the low-power monitor state; or if only one camera of the rear dual camera is started, to control the started camera to enter a normal photographing state from the low-power monitor state, and to start and control the other camera which is not started, to enter the normal photographing state.

In some embodiments of the application, the apparatus further includes:

A photographing unit is configured to obtain the image of the current scene using a front camera upon reception of the instruction for starting the front camera; to correct the color temperature and the brightness of the obtained image using the color temperature and automatic exposure parameters of the current scene updated in real time through the rear dual camera in the low-power monitor state; and to disable the rear dual camera in the low-power monitor state after N frames of preview images are output consecutively.

In some embodiments of the application, the parameter updating unit 51 is configured to control a front camera of the terminal to enter a low-power monitor state, after the terminal is powered on; to obtain brightness information and color temperature information of the current scene using the front camera in the low-power monitor state; to update the automatic exposure parameters of the current scene using the obtained brightness information; and to update the color temperature parameters of the current scene using the obtained color temperature information.

In some embodiments of the application, the apparatus further includes:

A photographing unit is configured to control the front camera to enter a normal photographing state from the low-power monitor state, upon reception of the instruction for starting the front camera.

In some embodiments of the application, the apparatus further includes:

A photographing unit is configured to obtain the image of the current scene through a rear dual camera upon reception of an instruction for starting the rear dual camera; to correct the color temperature and the brightness of the obtained image using the color temperature and automatic exposure parameters of the current scene updated in real time by the front camera in the low-power monitor state; and to disable the front camera in the low-power monitor state after N frames of preview images are output consecutively.

Figure 6:
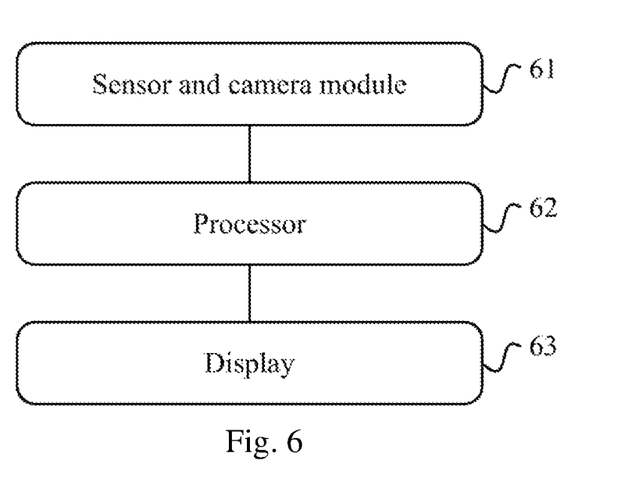
FIG. 6 is a schematic structural diagram of a terminal according to some embodiments of the application.

Some embodiments of the application further provide a terminal, and FIG. 6 illustrates a schematic structural diagram of a terminal according to some embodiments of the application, where the terminal can perform the method for previewing an image according to the embodiments above, and as illustrated in FIG. 6, the terminal can include:

A sensor and camera module 61 is configured to obtain and update in real time color temperature and automatic exposure parameters of a current scene after the terminal is powered on; and to obtain an image of a current scene upon reception of an instruction for starting a camera;

A processor 62 is configured to correct color temperature and brightness of the obtained image using the color temperature and automatic exposure parameters of the current scene updated in real time; and to output the corrected image to a display as a preview image; and The display 63 is configured to display the image output by the processor 62.

In some embodiments of the application, the processor 62 is further configured:

To send an instruction for controlling the sensor and camera module to enter a low-power monitor state to the sensor and camera module 61, to instruct the camera module to enter the low-power monitor state; and to send an instruction for controlling the sensor and camera module to enter a photographing mode to the sensor and camera module 61, to instruct the sensor and camera module 61 to enter the photographing mode.

Figure 7:
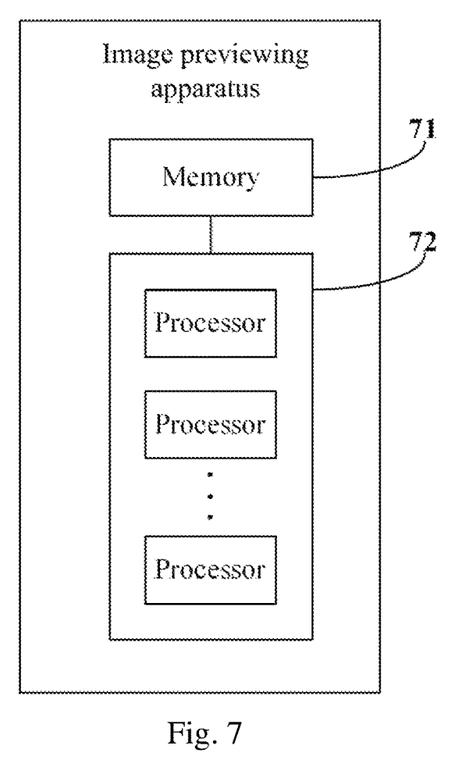
FIG. 7 is a schematic structural diagram of an apparatus for previewing an image on a smart terminal according to some embodiments of the application.

As illustrated in FIG. 7, some embodiments of the application further provide an apparatus for previewing an image on a terminal, the apparatus including a memory 71 and one or more processors 72, where the memory 71 is configured to store one or more computer readable program codes, and the one or more processors 72 are configured to perform the one or more computer readable program codes to perform:

Obtaining and updating in real time color temperature and automatic exposure parameters of a current scene;

Obtaining an image of the current scene using a camera upon reception of an instruction for starting the camera; and correcting color temperature and brightness of the obtained image using the color temperature and automatic exposure parameters of the current scene updated in real time; and Outputting the corrected image as a preview image.

In some embodiments of the application, obtaining and updating in real time the color temperature and automatic exposure parameters of the current scene includes:

Starting a light sensor and a color sensor; and

Obtaining brightness information of the current scene using the started light sensor, and updating the automatic exposure parameters of the current scene using the obtained brightness information; and obtaining color information of the current scene using the started color sensor, and updating the color temperature parameters of the current scene using the obtained color information.

In some embodiments of the application, obtaining and updating in real time the color temperature and automatic exposure parameters of the current scene includes:

Starting and controlling one camera of a rear dual camera to enter a low-power monitor state;

Obtaining brightness information and color temperature information of the current scene using the camera in the low-power monitor state; and Updating the automatic exposure parameters of the current scene using the obtained brightness information; and updating the color temperature parameters of the current scene using the obtained color temperature information.

In some embodiments of the application, controlling the camera to enter the low-power monitor state includes:

Obtaining pixel values of cameras in the rear dual camera respectively, determining whether the pixel values of the rear dual camera are the same, and if so, then controlling either of the cameras in the rear dual camera to enter the low-power monitor state; otherwise, controlling the camera with the lower pixel value to enter the low-power monitor state.

In some embodiments of the application, upon reception of the instruction for starting the camera, the one or more processors 72 are further configured to execute the one or more computer readable program codes to perform:

Determining whether one or both cameras of the rear dual camera are started, upon reception of the instruction for starting the rear dual camera; and If both of the cameras in the rear dual camera are started, then controlling the rear dual camera to enter a normal photographing state from the low-power monitor state;

If only one camera of the rear dual camera is started, then controlling the started camera to enter a normal photographing state from the low-power monitor state, and starting and controlling the other camera which is not started, to enter the normal photographing state.

In some embodiments of the application, upon reception of the instruction for starting the camera, the one or more processors 72 are further configured to execute the one or more computer readable program codes to perform:

Obtaining the image of the current scene using a front camera upon reception of the instruction for starting the front camera; and correcting the color temperature and the brightness of the obtained image using the color temperature and automatic exposure parameters of the current scene updated in real time through the rear dual camera in the low-power monitor state; and Disabling the rear dual camera in the low-power monitor state after N frames of preview images are output consecutively.

Figure 8:
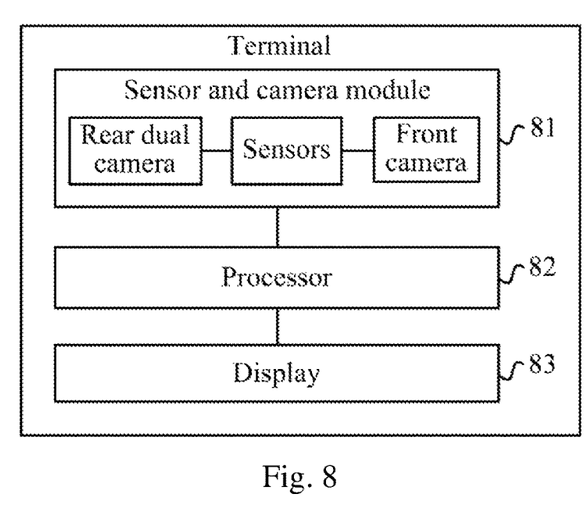
FIG. 8 is a schematic structural diagram of a smart terminal according to some embodiments of the application.

As illustrated in FIG. 8, some embodiments of the application further provide a terminal including:

A sensor and camera module 81 is configured to obtain and update in real time color temperature and automatic exposure parameters of a current scene; and to obtain an image of a current scene upon reception of an instruction for starting a camera; and A processor 82 is configured to correct color temperature and brightness of the obtained image using the color temperature and automatic exposure parameters of the current scene updated in real time; and to output the corrected image as a preview image.

In some embodiments of the application, the terminal further includes:

A display 83 is configured to display the preview image output by the processor 82.

In some embodiments of the application, the sensor and camera module 81 includes a light sensor and a color sensor, and the sensor and camera module 81 is configured:

To start the light sensor and the color sensor; and

To obtain brightness information of the current scene using the started light sensor, and to update the automatic exposure parameters of the current scene using the obtained brightness information; and to obtain color information of the current scene using the started color sensor, and to update the color temperature parameters of the current scene using the obtained color information.

In some embodiments of the application, the sensor and camera module 81 includes a rear dual camera, and the sensor and camera module 81 is configured:

To start and control one camera of the rear dual camera to enter a low-power monitor state;

To obtain brightness information and color temperature information of the current scene using the camera in the low-power monitor state; and To update the automatic exposure parameters of the current scene using the obtained brightness information; and to update the color temperature parameters of the current scene using the obtained color temperature information.

In some embodiments of the application, the sensor and camera module 81 includes a front camera, and the sensor and camera module 81 is configured:

To start and control a front camera to enter a low-power monitor state;

To obtain brightness information and color temperature information of the current scene using the front camera in the low-power monitor state; and To update the automatic exposure parameters of the current scene using the obtained brightness information; and to update the color temperature parameters of the current parameter using the obtained color temperature information.

It shall be noted that the apparatus for previewing an image according to some embodiments of the application can be the terminal according to some embodiments of the application.

The application has been described in a flowchart and/or a block diagram of the method, the device (system) and the computer program product according to the embodiments of the application. It shall be appreciated that respective flows and/or blocks in the flowchart and/or the block diagram and combinations of the flows and/or the blocks in the flowchart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flowchart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flowchart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flowchart and/or the block(s) of the block diagram.

Although the preferred embodiments of the application have been described, those skilled in the art benefiting from the underlying inventive concept can make additional modifications and variations to these embodiments. Therefore, the appended claims are intended to be construed as encompassing the preferred embodiments and all the modifications and variations coming into the scope of the application.

Evidently, those skilled in the art can make various modifications and variations to the application without departing from the scope of the application. Thus, the application is also intended to encompass these modifications and variations thereto so long as the modifications and variations come into the scope of the claims appended to the application and their equivalents.

The invention claimed is:

1. A method of previewing an image on a terminal, the method comprising:

starting, by the terminal, at least one camera of a rear dual camera of the terminal;

controlling, by the terminal, the at least one camera to enter a low-power monitor state;

obtaining, by the terminal, brightness information and color temperature information of the current scene using the at least one camera in the low-power monitor state;

updating, by the terminal, in real time automatic exposure parameters of the current scene using the obtained brightness information, and updating in real time color temperature parameters of the current scene using the obtained color temperature information;

obtaining, by the terminal, an image of the current scene using a camera upon reception of an instruction for starting the camera;

correcting, by the terminal, color temperature and brightness of the obtained image using the color temperature parameters and the automatic exposure parameters of the current scene updated in real time; and outputting, by the terminal, the corrected image as a preview image.

2. The method according to claim 1, wherein controlling, by the terminal, the at least one camera to enter the low-power monitor state comprises:

obtaining, by the terminal, pixel values of cameras in the rear dual camera respectively;

determining whether the pixel values of the cameras are the same;

when the pixel values are the same, controlling either one of the cameras to enter the low-power monitor state; and when the pixel values are not the same, controlling one of the cameras with a lower pixel value to enter the low-power monitor state.

3. The method according to claim 1, wherein when the instruction for starting the camera is an instruction for starting the rear dual camera of the terminal, the method further comprises:

determining, by the terminal, whether one or both cameras in the rear dual camera are started, upon reception of the instruction for starting the rear dual camera;

when both of the cameras are started, controlling, by the terminal, both cameras in the rear dual camera to enter a normal photographing state from the low-power monitor state; and when only one of the cameras is started, controlling, by the terminal, the one started camera to enter a normal photographing state from the low-power monitor state, starting the other camera that is not started, and controlling the other camera to enter the normal photographing state.

4. The method according to claim 1, wherein when the instruction for starting the camera is an instruction for starting a front camera of the terminal, the method further comprises:

obtaining, by the terminal, the image of the current scene using the front camera upon reception of the instruction for starting the front camera; and correcting the color temperature and the brightness of the obtained image using the color temperature parameters and automatic exposure parameters of the current scene updated in real time through the at least one camera of the rear dual camera in the low-power monitor state.

5. A method of previewing an image on a terminal, the method comprising:

starting, by the terminal, a front camera of the terminal;

controlling, by the terminal, the front camera to enter a low-power monitor state;

obtaining, by the terminal, brightness information and color temperature information of the current scene using the front camera in the low-power monitor state; and updating, by the terminal, in real time automatic exposure parameters of the current scene using the obtained brightness information, and updating in real time color temperature parameters of the current scene using the obtained color temperature information;

obtaining, by the terminal, an image of the current scene using a camera upon reception of an instruction for starting the camera;

correcting, by the terminal, color temperature and brightness of the obtained image using the color temperature parameters and the automatic exposure parameters of the current scene updated in real time; and outputting, by the terminal, the corrected image as a preview image.

6. The method according to claim 5, wherein when the instruction for starting the camera is an instruction for starting the front camera, the method further comprises:

controlling, by the terminal, the front camera to enter a normal photographing state from the low-power monitor state, upon reception of the instruction for starting the front camera.

7. The method according to claim 5, wherein when the instruction for starting the camera is an instruction for starting a rear dual camera, the method further comprises:

obtaining, by the terminal, the image of the current scene through the rear dual camera upon reception of the instruction for starting the rear dual camera;

correcting the color temperature and the brightness of the obtained image using the color temperature parameters and automatic exposure parameters of the current scene updated in real time by the front camera in the low-power monitor state.

8. A terminal comprising:

a sensor and camera module comprising a rear dual camera, the sensor and camera module configured to:

start and control at least one camera of the rear dual camera to enter a low-power monitor state;

obtain brightness information and color temperature information of the current scene using the at least one camera in the low-power monitor state;

update in real time automatic exposure parameters of the current scene using the obtained brightness information, and update in real time color temperature parameters of the current scene using the obtained color temperature information;

obtain an image of the current scene using a camera upon reception of an instruction for starting the camera; and a processor configured to:

correct color temperature and brightness of the obtained image using the color temperature parameters and the automatic exposure parameters of the current scene updated in real time; and output the corrected image as a preview image.

9. The terminal according to claim 8, wherein the terminal further comprises:

a display configured to display the image output by the processor.

10. A terminal comprising:

a sensor and camera module comprising a front camera, the sensor and camera module configured to:

start and control the front camera to enter a low-power monitor state;

obtain brightness information and color temperature information of the current scene using the front camera in the low-power monitor state;

update in real time the automatic exposure parameters of the current scene using the obtained brightness information, and update in real time the color temperature parameters of the current parameter using the obtained color temperature information;

obtain an image of the current scene using a camera upon reception of an instruction for starting the camera; and a processor configured to:

correct color temperature and brightness of the obtained image using the color temperature parameters and the automatic exposure parameters of the current scene updated in real time; and output the corrected image as a preview image.

11. The terminal according to claim 10, wherein the terminal further comprises:

a display configured to display the image output by the processor.

* * * * *